United States Patent [19]
Claussen et al.

[11] Patent Number: 6,051,277
[45] Date of Patent: *Apr. 18, 2000

[54] AL$_2$O$_3$ COMPOSITES AND METHODS FOR THEIR PRODUCTION

[75] Inventors: Nils Claussen, Auf den Schwarzen Bergen 15, D-21224 Rosengarten; Florian Wagner, Hamburg, both of Germany

[73] Assignee: Nils Claussen, Rosengarten, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/801,930

[22] Filed: Feb. 15, 1997

[30] Foreign Application Priority Data

Feb. 16, 1996 [DE] Germany .................. 196 05 858

[51] Int. Cl.$^7$ ...................................... B05D 3/02
[52] U.S. Cl. .............. 427/376.3; 427/215; 427/314; 427/431; 427/192
[58] Field of Search ................. 427/215, 314, 427/376.2, 376.3, 431, 192

[56] References Cited

U.S. PATENT DOCUMENTS

| | | | |
|---|---|---|---|
| 4,818,734 | 4/1989 | Kanter et al. | 501/128 |
| 4,847,044 | 7/1989 | Ghosh | 419/8 |
| 5,268,061 | 12/1993 | Sunwoo et al. | 156/608 |
| 5,268,339 | 12/1993 | Aghajanian et al. | 501/127 |
| 5,503,874 | 4/1996 | Ackerman et al. | 427/237 |
| 5,518,061 | 5/1996 | Newkirk et al. | 164/97 |
| 5,607,630 | 3/1997 | Claussen | 264/60 |
| 5,633,213 | 5/1997 | Aghajanian et al. | 501/87 |

OTHER PUBLICATIONS

Chemical Abstracts 125:174928; JP 94–309887; Patentee: Maikuro Tekuno Kk, Japan; by T Kuramoto, T Hyama, K Arita, H Fukunaga; Wear–Resistant Light Alloy Members and Their Preparation, 1996.

Chemical Abstracts 114:47607; Dep. Mech. Eng., Hiroshima Univ., Japan, J. Mater. Sci. Lett. (1991); by H Fukunaga, X Wang, Y Aramaki; Preparation of Intermetallic Compound Matrix By Reaction Squeeze Casting.

Chemical Abstracts 121:261403; JP 92–340413; Patentee: Shingijutsu Kaihatsu Jigyodon, Japan; by H Fukunaga; Composite Materials and Their Preparation, 1994.

Journal of Materials Science Letters 9 (1990) p. 23–25; Preparation of Intermetallic Compound Matrix Composites By Reaction Squeeze Casting; by H Fukunaga and X. Wang; Dept. of Mech. Eng. Hiroshima University, Japan; and Y. Aramaki, Lab. of Tech. Dev., Japan; c 1991 Chapman & Hall Ltd.

Abstract of JP6192767;A 940712 DW9432 C22C1/10 006PP; Composite Material Produce Slide Part Squeeze Cast Preform Mix Titanium@ Oxide Aluminum@ Alloy; by Shingijutsu Jigyodan, 1994.

Abstract of JP8143990; A 960604; Micro Techno KK; Res Dev Corp of Japan; by K Tadayuki, H Takashi, A Kazuji, F Hideharu; C22Cl/–09; Wear Resistant Composite Light Alloy Member and Its Production, 1996.

*Primary Examiner*—Shrive Beck
*Assistant Examiner*—Michael Barr
*Attorney, Agent, or Firm*—Fulbright & Jaworski, LLP

[57] ABSTRACT

The invention relates to a process for the production of a cerametallic composite part containing a phase rich in Al$_2$O$_3$ which is permeated by a metallic phase consisting predominantly of aluminides, in which process a preform that may have been sintered and comprises at least one oxidic compound reducible by aluminium and maybe also non-oxidic compounds or elements is reacted with molten aluminium or aluminium alloy until aluminide and Al$_2$O$_3$ have formed at least in the surface layer. Composite parts fabricated in this way can serve as wear-resistant or/and high-temperature-resistant components in the construction of machinery, apparatus, engines and turbines, for applications under corrosive or/and oxidizing conditions, as functional elements, especially high-performance brake elements and as electrical or magnetic functional elements.

37 Claims, 4 Drawing Sheets

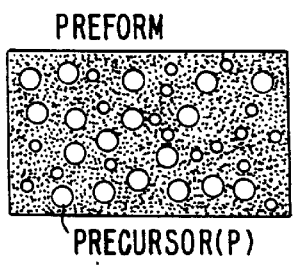
FIG. 1a-1
PREFORM
PRECURSOR(P)
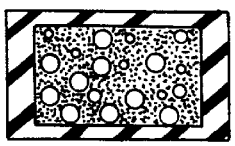
FIG. 1a-2
T > 660°C
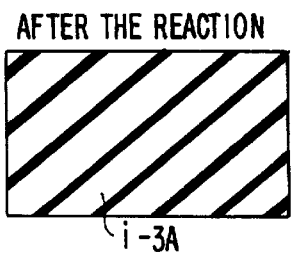
FIG. 1a-3
AFTER THE REACTION
i-3A
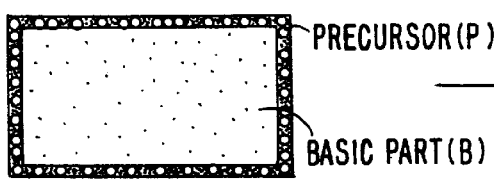
FIG. 1b-1
PRECURSOR(P)
BASIC PART(B)
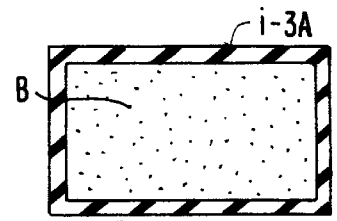
FIG. 1b-2
i-3A
B
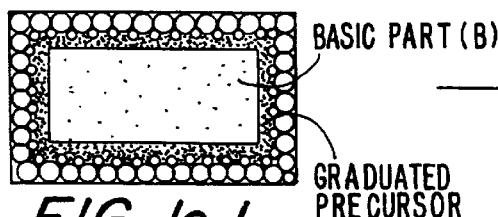
FIG. 1c-1
BASIC PART(B)
GRADUATED PRECURSOR
FIG. 1c-2 GRADUATED i-3A LAYER
B
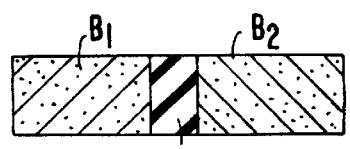
FIG. 1d-1
B1  P  B2
FIG. 1d-2
B1  B2
i-3A COMPOSITE
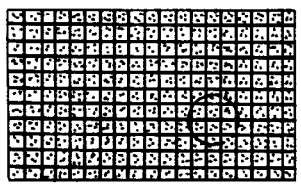
FIG. 1e-1
FIBER PREPREG INFILTRATED WITH PRECURSOR
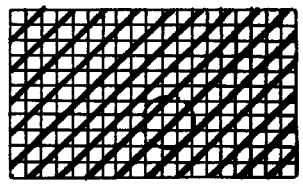
FIG. 1e-2
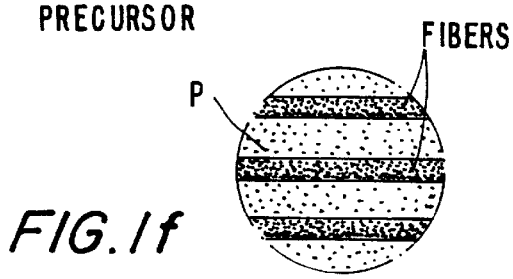
FIG. 1f
FIBERS
P
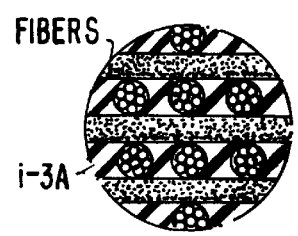
FIG. 1g
FIBERS
i-3A INFILTRATED WITH P=ΔV
PORES
MeO
PRECURSOR

PARTIALLY

Al₂O₃
MeAl
COMPLETELY

INFILTRATED WITH P>ΔV

PARTIALLY

COMPLETELY

INFILTRATED WITH P<ΔV

SURFACE UNDER PRESSURE

PARTIALLY UNREACTED

ΔV
ENLARGED

BLOCKED

SQUEEZED OUT

IMMERSION

PRESSURE-DIE CASTING

BEFORE THE REACTION

AFTER THE REACTION

PART COATED WITH PRECURSOR

HEAT-TREATED

PRECURSOR

EXAMPLE:

40 VOL-% $Al_2O_3$-NETWORK
19 VOL-% TiO
41 VOL-%

COMPLETELY INFILTRATED

40 VOL-% $Al_2O_3$-NETWORK
15.9 VOL-% $Al_2O_3$
36.3 VOL-% $TiAl_3$
7.8 VOL-% Al

AL₂O₃ COMPOSITES AND METHODS FOR THEIR PRODUCTION

BACKGROUND OF THE INVENTION

Reactive production techniques for ceramic or cerametallic parts, for the surfaces of functional parts or of structural members and for the matrices of composites reinforced with fibers or other reinforcing elements are among the particularly uncomplicated and economical production methods within the field of materials technology. The principle is based on the production of high-value added materials by way of a reaction between two or more raw materials—often inexpensive ones—at temperatures which are very often lower than the usual (reaction-free) production temperatures. Typical features of reactive production methods are: low cost, near net shape and high purity of the product.

New strengthening strategies for ceramic materials are based on incorporating a second phase in the ceramic matrix, with the useful properties of the ceramic material being for the most part retained. Examples here are transformable $ZrO_2$ particles ("Strengthening Strategies for $ZrO_2$—toughened Ceramics at High Temperatures", J. Mat. Sci. Eng., 71 (1985) 23) or SiC whiskers ("TZP Reinforced with SiC Whiskers", J. Am. Ceram. Soc., 69 (1986) 288) in an $Al_2O_3$ matrix. The incorporation of metals was initially considered not to be useful, since according to traditional theories on composites, metals, with low yield limits and low elastic moduli, would not be able to improve hard and rigid ceramics, especially not in respect of their strength. Admittedly, it has been shown recently that this is not always the case ("Effect of Microstructure on Thermal Shock Resistance of Metal-Reinforced Ceramics", J. Am. Ceram. Soc. 77 (1994) 701 and "Metalle verbessern mechanische Eigenschaften von Keramiken", Spektrum der Wissenschaft, Januar (1993) 107). However, the strengthening effect is only achieved if the microstructure of the classical cermets is reversed, i.e. the ceramic material forms a rigid matrix which is permeated by a monocrystalline metallic phase. The designation "metcers" would in this case constitute a conceptual characterization of the reversal in microstructural components. Quite apart from the modified microstructure of these composites, it is also the significantly smaller quantity of the metal phase which is responsible for the improvement compared to conventional cermets. The metal embedded in the ceramic matrix has considerably better mechanical properties than it does in the "free" state, a phenomenon which seems to apply even for otherwise brittle intermetallic phases ("Metcers—a Strong Variant of Cermets", Cfi/Ber. DKG 71 (1994 301).

So far, a number of different methods have been used to produce these novel metal-ceramic composites, for example the directed oxidation of molten metals (DMO), where an $Al/Al_2O_3$ composite grows on molten aluminium by way of oxidation in air (see e.g. "Formation of Lanxide™ Ceramic Composite Materials", J. Mat. Res. 1 (1986) 81 and "Directed Oxidation of Molten Metals" in: Encyclopedia of Mat. and Eng. (Ed. R. W. Cahn), Supplementary Vol. 2, Pergamon, Oxford (1990) 1111). Other practicable methods are pressure-die casting ("Application of the Infiltration Technique to the Manufacture of Cermets", Rep. Dt. Keram. Ges., 48 (1971) 262–8) and the infiltration of porous ceramic preforms with molten metal ("Method for Processing Metal-Reinforced Ceramic Composites", J. Am Ceram. Soc., 73 [2] 388–393 (1990). Gas-pressure infiltration provides a means of infiltrating non-wetting metals into the ceramic preform (see e.g. "Microstructure and Properties of Metal Infiltrated RBSN Composites", J. Eur. Ceram. Soc. 9 (199161–65). The metal is first melted in a vacuum and then, once the infiltration temperature has been reached—usually 100 to 200° C. above the melting point—the ceramic preform is dipped into the molten metal and a gas pressure built up. This technique is also suitable for metals with high melting points, which cannot be infiltrated into the ceramic preform using the conventional pressure-die casting method, but is time-consuming and very expensive.

Another method of producing an $Al_2O_3$ part permeated by Al is based on reactive metal infiltration of ceramic preforms containing $SiO_2$ (see e.g. $Al_2O_3$/Al Co—Continuous Ceramic Composite ($C^4$) Materials Produced by Solid/Liquid Displacement Reactions: Processing, Kinetics and Microstructures", Ceram. Eng. Sci. Proc. 15 (1994) 104).

Composite parts containing Al and $Al_2O_3$ can also be produced by means of thermite-based reactions (SHS: Self-Propagating High-Temperature Synthesis). A large number of such reactions have been investigated so far, all of which proceed according to the scheme:

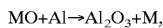

$$MO+Al \rightarrow Al_2O_3+M,$$

where M is a metal and MO the corresponding oxide (see e.g. "Combustion Synthesis of Ceramic and Metal-Matrix Composites", J. Mat. Synth. Proc. 2 (1994) 71 and "Thermodynamic Analysis of Thermite-Based Reactions for Synthesis of Oxide-$B_4C$ Composites", J. Mat. Synth. Proc., 2 (1944) 217 and 227). As a result of the uncontrollable generation of heat (the reaction is highly exothermic) all SHS composites are porous, inhomogeneous and of coarse microstructure. As a result their strength seldom exceeds 100 MPa, which means their use as structural members is out of the question.

Research in the field of materials has for a long time pursued the goal of substituting intermetallic compounds for metals in many areas, also in metal-ceramic composites. The intermetallic compounds of Al (aluminides) are especially in demand here due to their low specific gravity, good high-temperature stability and their resistance to oxidation (see e.g. "Intermetallic Compounds", Mat. Res. Soc. Proc. Vol. 288, 1993). However, the powder-metallurgical production of aluminides with ceramic phases has up till now been very costly, since, on the one hand, the production of the aluminide powder is very expensive because of the extremely inert conditions required and, on the other hand, the powder can only be fully compacted by means of hot pressing, hot forging, hot extrusion, hot isostatic pressing, or explosive forming (see e.g. "Powder Processing of Intermetallics and Intermetallic Matrix Composites (IMC)" p. 93–124 in Processing and Fabrication of Advanced Materials for High-Temperature Applications-II, ed. V. A. Ravi et al, The Min. Met. Mat. Soc., 1993). Moreover, in all cases the aluminide constitutes the matrix, while the $Al_2O_3$ is dispersed as particulate phase and makes up less than 50% of the volume (see e.g. "A Review of Recent Developments in $Fe_3Al$—Based Alloys", J. Mat. Res. 6 (1991) 1779 and "Powder Processing of High-Temperature Aluminide-Matrix Composites", H-T Ordered Intermetallic Alloys III, 133 (1988) 403). For the production of such composites use can be made of the reaction heat by having two or more metals react with each other to form the desired aluminide, but in all cases investigated so far this procedure results in coarse and inhomogeneous microstructures, which means that mechanical properties were either not measured at all ("Reactive Sintering Nickel-Aluminide to Near Full Density", PMI 20 (1988) 25), or that, in a further step, the preformed part had to be subjected to hot-wet compaction ("SHS of TiAl—SiC and TiAl—Al$_2$O$_3$ Intermetallic Composites", J. Mater. Sci. Let., 9 (1990) 432).

All hitherto known forms of composites and the methods of production thereof have characteristic disadvantages. The pressure-die casting technique, for example, is for technical reasons (no suitable pressure-vessel material available) only suitable for Al alloys, not, however, for high-melting-point aluminides. Similar limitations apply to gas-pressure infiltration, where aluminides can only be infiltrated at temperatures far in excess of 1400° C. Moreover, in this case the infiltrated composite part would still have to be extricated from the solidified aluminide melt, an extremely tedious procedure and only possible for parts with simple geometry. Reactive-type processes such as DMO and C$^4$ can only be used for Al$_2$O$_3$ parts with Al alloys containing Si or Mg, i.e. not for alloys containing aluminides. Besides, the reaction speeds are extremely low, averaging only 2 cm/day, which means that the procedure is extremely time-consuming. All powder-metallurgical processes used hitherto have resulted in the disadvantages typical of oxide-ceramic cermets, i.e. without subsequent hot compaction, the microstructure is porous, coarse (microstructural components usually being much larger than 10 μm) and inhomogeneous, which results in inadequate strength as well as brittleness.

According to a process suggested at an earlier date, in which a number of the aforementioned disadvantages are eliminated, a green compact is formed out of an intensively mixed and ground powder mixture comprising Al, oxides and, if required, further additives; during heat treatment in an inert atmosphere the green compact is converted, i.e. reaction-formed (3A process) into a composite containing Al$_2$O$_3$ and aluminide. This process has the following disadvantages: a) heat treatment has to be carried out at temperaturtes >1400° C., b) reaction and compaction incur shrinkage of between 10 and 20% which, among other things, makes it difficult to apply the process to composites, c) the intensive grinding has to be performed in organic solvents, making the process expensive and not particularly environmentally sound, d) the finely-ground aluminium fraction renders the mixture highly inflammable, necessitating expensive safety measures, e) the proportion of aluminium which oxidizes during grinding (necessary for safety reasons) cannot be adjusted accurately, f) the process is more suitable for solid parts and less for coatings.

The object of the present invention is thus to avoid the disadvantages of the above-mentioned process without causing any deterioration in the product.

The various features of novelty which characterizes the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

Figures 1, 2A:
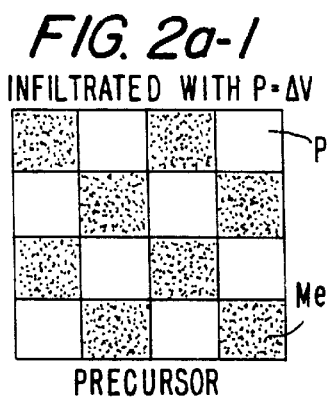
FIG. 1 of the drawings illustrates in flow sheet format the principle of producing i-3A components and layers according to the invention.

This object is achieved according to the invention by a process for making a cerametallic composite part containing a phase rich in Al$_2$O$_3$ which is permeated by a metallic phase consisting predominantly of aluminides. In the process a preform which may have been sintered and comprises at least one oxidic compound reducible by aluminium and, if necessary, also non-oxidic compounds or elements, is reacted with molten aluminium or aluminium alloy until aluminide and Al$_2$O$_3$ have formed at least in the surface layer.

The preform can be an unsintered green compact or else a precursor obtained by sintering (or plasma spraying) a green compact.

According to the invention, therefore, an oxide-containing preform—which can be a formed piece, a layer, an intermediate layer or the matrix of a composite and can be an unsintered green compact or else presintered—is reacted with molten Al or an Al alloy such that the resulting product, referred to from now on as i-3A (for infiltrated alumina-aluminide alloys), contains Al$_2$O$_3$ and aluminide. The reaction which takes place can be represented, for example, by the equation

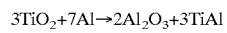

$$3TiO_2 + 7Al \rightarrow 2Al_2O_3 + 3TiAl$$

for the case of a preform which contains TiO$_2$ as oxidic compound reducible by aluminium. Besides this oxide, it is useful if the preform also contains Al$_2$O$_3$, preferably in an amount ranging from 20 to 50 vol. % relative to the dense part. It is of advantage to start with a preform that contains Al$_2$O$_3$ in a quantity such that there is an Al$_2$O$_3$ phase which forms a continuous supporting framework.

It is of advantage if the Al$_2$O$_3$ phase has Al$_2$O$_3$ with grain sizes averaging between 0.1 and 10 μm. The metallic phase contains one or more of the following aluminides: TiAl, TiAl$_3$, Ti$_3$Al, Ni$_3$Al, NiAl, Fe$_3$Al, FeAl, Zr$_3$Al, Ni$_2$TiAl, Fe$_3$(Al,Si), NbAl$_3$, Nb$_3$Al, TaAl$_3$, Ta$_3$Al, FeCrAl, Fe$_3$AlC, Co$_2$TiAl, FeTiAl, Ti$_2$NbAl, Ti$_5$(Al,Si)$_3$. In addition, the metallic phase can contain Al. It can also contain one or more of the elements from the group Au, Ag, B, Ce, Cu, Ca, Cr, Co, Fe, Ge, Hf, K, U, Mo, Mg, Mn, Ni, Ta, Ti, Zn, Zr, Si, Sb, Sn, Y, Sc, W, V. If the metallic phase contains such elements, the proportion thereof can amount to up to 20 vol. %.

Examples of oxidic compounds that can be reduced by aluminium and can be used in the preform are CaO, Cr$_2$O$_3$, CuO, CoO, Co$_2$O$_3$, FeO, Fe$_2$O$_3$, Fe$_3$O$_4$, HfO$_2$, Li$_2$O, MnO, MgO, MoO$_3$, Na$_2$O, Nb$_2$O, Nb$_2$O$_5$, NiO, SiO$_2$, TiO, TiO$_2$, V$_2$O$_5$, WO$_3$, Y$_2$O$_3$, ZrO$_2$, mullites, spinels, zirconates, titanates and ores containing Fe, Ti, Co, Ni, Zr, Si, Nb, in particular zircon (ZrSiO$_4$) or ilmenite (FeTiO$_3$).

The preform is made from the finely-ground components using familiar powder-metallurgical techniques such as pressing, spraying, slip casting and the like. It is preferable if use is made here of powder with an average particle size between 0.1 and 100 μm, a particle size between 0.3 and 10 μm being especially preferable. Apart from the essential components, i.e. Al$_2$O$_3$ and at least one oxide reducible by aluminium, further ceramic and/or metallic phases can be added to the powder mixture used to make the preform.

If required, reinforcing or functional components can be added to the powder mixture. It is of advantage if these take the form of particles, nodules, flakes, whiskers, fibers or the like. The proportion by volume of such reinforcing additives is preferably in the range from 5 to 50%. If these additives are present in greater or smaller proportions, the properties of the basic part cannot be influenced to the same degree, and the reinforcement effect, for example, is small. These reinforcing or functional components preferably measure between 0.5 and 1000 μm in diameter. Under these conditions the excellent mechanical properties of the basic part are maintained. Suitable components that can be added are oxides, carbides, nitrides, borides and/or silicides, with carbon, diamond, SiC, $Al_2O_3$, $Si_3N_4$, TiC, WC and/or $ZrO_2$ being preferred. $ZrO_2$ has proved to be especially advantageous with respect to formation of the microstructure.

The preform can be a green compact or else a presintered or plasma-sprayed precursor.

It is of advantage if the powder mixture is of a composition such that the $Al_2O_3$ phase forms a continuous network in the presintered or/and plasma-sprayed precursor. The $Al_2O_3$ phase can also be formed from appropriate reinforcing components, which can consist, in particular, of platelets or continuous or discontinuous fibers with diameters ranging from 5 to 150 μm. If the fibers here are of the continuous type, it is of advantage to use them in the form of a prepreg.

In a special embodiment, a preformed prepreg as defined above is infiltrated with the precursor powder suspension. Other suitable reinforcing components consist of coated or non-coated fibers such as SiC, SiCB, SiCBN, $Si_3N_4$ or mullite. It is also possible to provide a continuous $Al_2O_3$ phase only at the surface of the green compact, e.g. in the form of an $Al_2O_3$ container surrounding the $Al_2O_3$—free green compact.

Non-oxidic compounds or elements which react with molten aluminium to form aluminides can also be added to the powder mixtures used for making the green compact or precursor.

The green compact, which may be processed to a precursor, is produced using known powder-metallurgical techniques. All so-called P/M processes are suitable, i.e. single-axis or isostatic pressing, injection molding, slip casting, extrusion and the like. These methods are familiar to persons versed in the art and do not require any detailed explanation here. When these techniques are used to produce a green compact which is subsequently sintered to form a precursor, the production technique can be adjusted such that the green compact has the desired porosity. In a preferred embodiment of the invention the green compact is accordingly formed in such manner that, even after sintering, it exhibits a predominantly open porosity. Typically, when the green compact is made by isostatic pressing—e.g. at pressures ranging from 50 to 900 MPa—its density can be varied between 49% TD (50 MPa) and 62% (900 MPa).

It is advantageous if the open porosity accounts for 5 to 60%, preferably 10 to 40%.

The green compact or precursor can, however, also be built up in layers on a basic part, for example by immersing the basic part in a powder suspension (dip-coating), by spraying on the suspension or by using coating techniques such as thermal or plasma spraying. In this case the powder suspension is prepared by suspending the ground starting materials for production of the green compact in an aqueous or organic solvent. According to this embodiment of the invention the coating can be built up of several individual layers (can be graduated), with the individual layers containing both material of the green compact or precursor as uppermost layer and material of the basic part. The proportion by volume of the basic-part material increases continuously or discontinuously with increasing proximity of the layers to the basic part. For this kind of layer formation it is useful to grind the powder mixture intended for the precursor either dry, in water or in an organic liquid so as to obtain the aforementioned suspension. Ball pulverizers are particularly suitable here.

In this embodiment of the invention it is useful to apply the precursor powder in layers ranging in thickness from 10 μm to 1 cm to any arbitrary basic part made of inorganic material. The green-compact layers built up in this way can then be sintered as described above. It is expedient to carry out the sintering process itself in an oxygen-containing atmosphere, especially in air at temperatures in the range from 1000° C. to 1400° C.

Using the procedure described above one obtains the sintered preform (precursor) in porous form. However, densely sintered preforms are also suitable for the invention. These can be obtained, for example, by sintering at temperatures above 1400° C. to 1700° C.

The green compact or precursor prepared in the manner described is then brought into contact with molten aluminium or a molten aluminium alloy until it is completely or, at least in the surface region, partly converted into $Al_2O_3$ and aluminides. Suitable temperatures range from 660 to 1300° C., preferably being between 750 and 1100° C. The treatment can be carried out by dipping the green compact or precursor into molten aluminium or by applying molten or liquefied aluminium to the surfaces. The molten aluminium (under which term, in the following, aluminium alloys are also covered) can be applied under vacuum or under normal pressure in air or in an inert atmosphere, such as $N_2$ or Ar, in a reducing atmosphere such as the protective gas "Formiergas", $H_2$ or the like, or else under excess pressure. More specifically, the liquid aluminium can be brought into contact with the green compact or precursor using pressurized gas or in a pressure-die casting facility (squeeze casting).

If conversion to $Al_2O_3$ and aluminides is desired throughout the part, it is expedient to carry out the treatment in such manner that the molten aluminium can penetrate into the pore spaces of the preform and react there. Alternatively, the aluminium can also be sprayed as a powder suspension onto the preform, or the preform can be dipped into a suspension of aluminium powder, the aluminium powder on the preform subsequently being heated to the reaction temperature of 660° C. by way of a heat treatment which is effective primarily at the surface of the part. A laser, for example, which can generate the necessary temperatures, is a suitable means for this embodiment of the invention. It is also possible to apply the aluminium to the surface of the precursor by means of thermal or plasma spraying, CVD or PVD.

The composite part produced according to the invention can also be subjected to an aftertreatment. This involves heating the part in an oxygen-containing atmosphere at temperatures in the range from from 800 to 1400° C. until an $Al_2O_3$-enriched surface layer has been formed. Alternatively, or in addition, the part can be annealed in a vacuum or an inert or reducing atmosphere at a temperature in the range from 1000 to 1600° C. until the desired microstructure has been obtained for the intermetallic and, if applicable, metallic phase, or until such phases as have the desired properties have been formed.

Figure 3A:
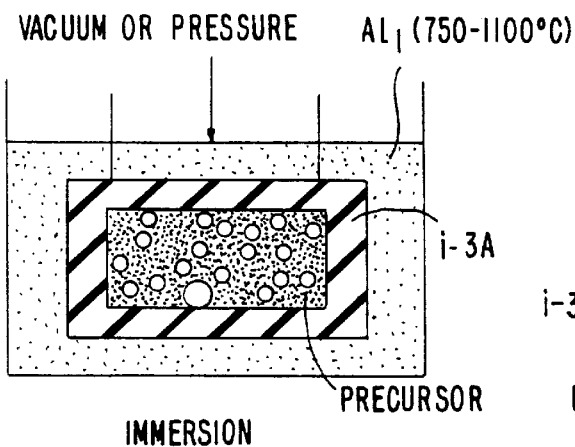
Figure 3B:
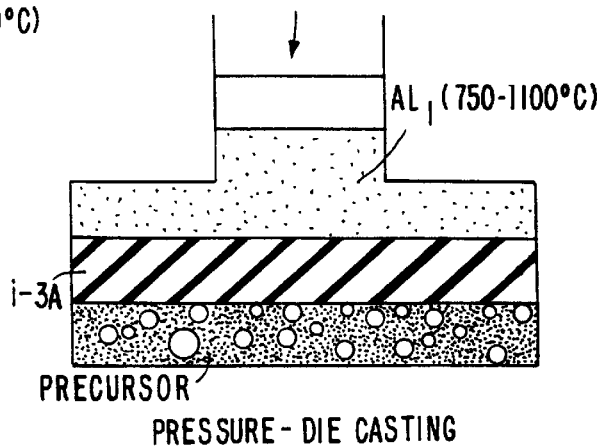
Figures 1, 3C:
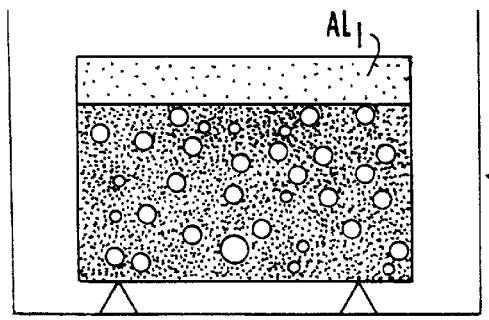
Figures 2, 3C:
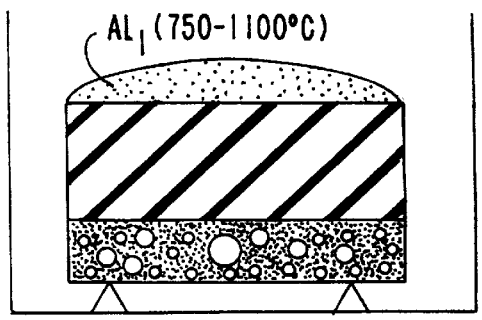

In the least complex embodiment of the method according to the invention a powder-metal compact made of an oxide reducible by aluminium (e.g. $TiO_2$, NiO, $ZrO_2$, $Nb_2O_5$, CaO, $Cr_2O_3$, CuO, $Cu_2O$, CoO, $Co_2O_3$, FeO, $Fe_2O_3$, $Fe_3O_4$, $HfO_2$, $Li_2O$, MnO, MgO, $MoO_3$, $Na_2O$, $Nb_2O$, $SiO_2$, TiO, $V_2O_5$, $WO_3$, $Y_2O_3$, mullites, spinels, zirconates, titanates and ores containing Fe, Ti, Co, Ni, Zr, Si, Nb, in particular zircon ($ZrSiO_4$) or ilmenite ($FeTiO_3$)) is presintered at temperatures in the range from 1000° C. to 1400° C., so that an open porosity ($P_g$) of between 20 and 50% is obtained. It is of advantage if, in addition, $Al_2O_3$ is contained. It is of particular advantage if the $Al_2O_3$ fraction is high enough (20 to 50 vol. % relative to the dense part), for the $Al_2O_3$ phase to form a continuous supporting framework. In most cases the external dimensions of this preform hardly differ from those of the green compact, which means the desired porosity of the presintered preform can be obtained by adjusting the green compact accordingly, i.e. by means of the pressure applied. The preform (FIG. 1a) is subsequently dipped into molten aluminium (FIG. 3a) and infiltrated with molten aluminium, either under vacuum, normal pressure ($N_2$, Ar, but also air) or excess pressure (gas pressure, Ar, $N_2$ etc. or mechanical pressure as prevails, for example, in a pressure-die casting facility (FIG. 3b). During the infiltration the reaction $$(x+2)Al + (3/y)MO \rightarrow Al_2O_3 + M_{3/y}Al_x \qquad (1)$$

takes place either completely or partly.

MO stands for the metal oxide and $M_{3/y}Al_x$ is a corresponding aluminide. All the reactions in Table 1 taking place according to equation 1 are associated with a decrease in volume, i.e. the total volume of the starting products (left-hand side) is greater than that of the reaction products (right-hand side). Since, however, the preform as yet contains no aluminium, but this is contained in a sufficient quantity in the molten bath, it is not necessary to include the aluminium in the volume balance when considering the filling up of the pores P in the preform. This means that the reaction within the porous preform is associated with an increase in volume $\overline{\Delta V}$. The volume increases $\Delta V$ which are connected with the reaction but not related to a porous preform are listed in Table 1 below.

TABLE 1

| | $\overline{\Delta V}$ |
|---|---|
| 13 Al + 3 $TiO_2$ → 2 $Al_2O_3$ + 3 $TiAl_3$ | 190% |
| 7 Al + 3 $TiO_2$ → 2 $Al_2O_3$ + 3 TiAl | 90% |
| 5 Al + 3 $TiO_2$ → 2 $Al_2O_3$ + $Ti_3Al$ | 71% |
| 28 Al + 3 $Nb_2O_5$ → 5 $Al_2O_3$ + 6 $NbAl_3$ | 105% |
| 12 Al + $Nb_2O_5$ → 5 $Al_2O_3$ + 2 $Nb_3Al$ | 21% |
| 13 Al + 3 $Nb_2O_5$ → 5 $Al_2O_3$ + 3 $Nb_2Al$ | 26% |

This means that $$\Delta V = \overline{\Delta V}(1-P) \qquad (2)$$

with P being calculated from the overall porosity $P_g$ of the preform and the proportion by vol. of metal oxide $\overline{V}_{MO}$ in the starting mixture ($\overline{V}_{MO} + \overline{V}_{Al2O3} = 1$).

$$P = \frac{P_g}{(1-P_g)\overline{V}_{MO} + P_g} \qquad (3)$$

In this theoretical approach it is assumed that the external dimensions of the preform are not influenced by reactive infiltration. This was confirmed experimentally. This will now be explained in more detail by reference to the enclosed drawings.

Figures 2, 2A:
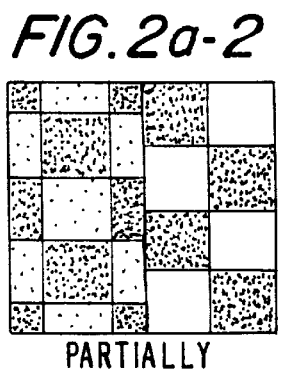
FIG. 2 illustrates the principle of the reaction taking place as a function of the relation P/ΔV.
Figures 2, 2A, 3:
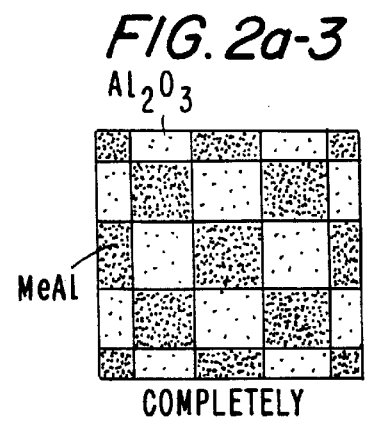
FIG. 3 diagrammatically shows various production processes mentioned for the preform and the reaction with aluminium.
Figures 1, 2B:
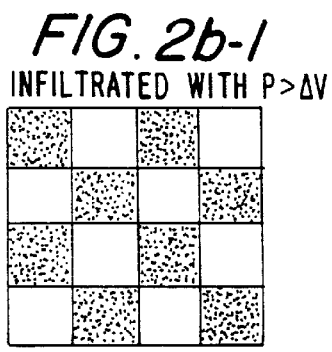
Figures 2, 2B:
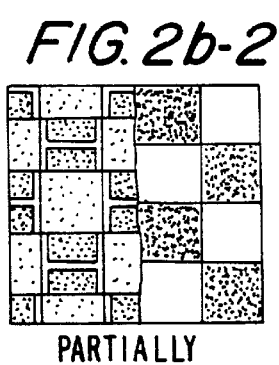
Figures 2, 2B, 3:
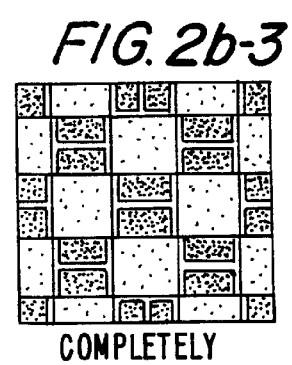
Figures 1, 2C:
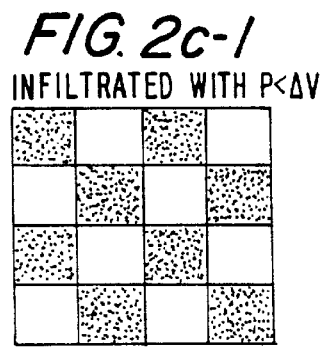
Figures 2, 2C:
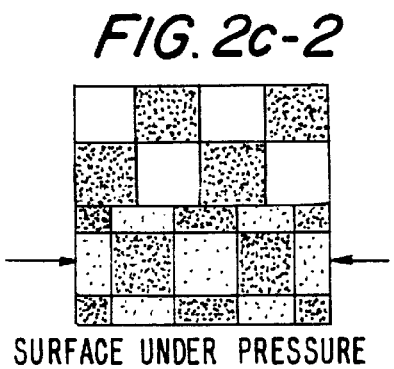
Figures 2, 2C, 3:
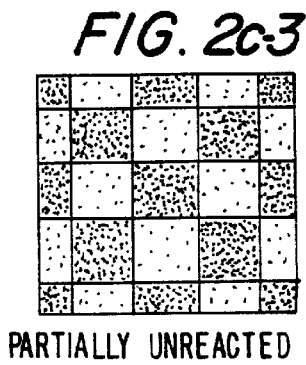
Figures 2, 2C, 3, 4:
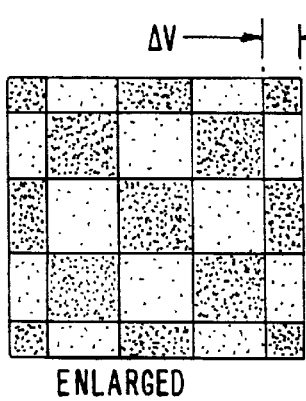
FIG. 4 summarizes the effect of the Al$_2$O$_3$ phase in the reaction between the preform and the molten aluminium.
Figures 2, 2C, 3, 4, 5:
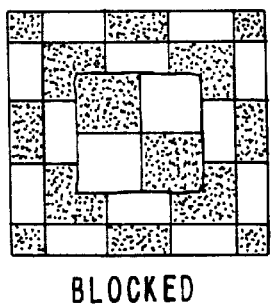
Figures 2, 2C, 3, 4:
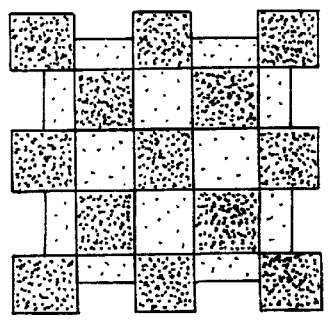

When P=$\Delta V$ (FIG. 2-I), the entire pore space of the preform is filled by the reaction product ($Al_2O_3 + M_{3/y}Al_x$). When P>$\Delta V$, the space which is not filled by reaction product ($P_{rest} = P - \Delta V$) is filled by aluminium or aluminium alloy (FIG. 2-II). This was shown to be the case, for example, in the system $TiO_2 \rightarrow Al_2O_3 + TiAl_3$ in the reactively infiltrated i-3A samples. If, by contrast, the pore space is less than the volume increase (i.e. P<$\Delta V$), reactive infiltration can be affected in various ways (FIG. 2-III a to e). Especially with the system $ZrO_2 \rightarrow Al_2O_3 + (ZrAl_3, ZrAl_2)$ there was enlargement and disintegration of the product in the Al bath (FIG. 2-III c). This, however, was primarily due to the fact that there was little or no $Al_2O_3$ in the precursor, which meant there was not the advantageous supporting effect of an $Al_2O_3$ network (see FIG. 4). When the proportion of $Al_2O_3$ was increased, as a result of which P>$\Delta V$, the system $ZrO_2(+Al_2O_3)$ also resulted in a dense $Al_2O_3$—($ZrAl_3$, $ZrAl_2$) part with a low proportion of aluminium and practically the same dimensions as the corresponding preform.

Through use of the method according to the invention, improvements in the following properties are obtained in most cases: error tolerance, fracture toughness, strength, thermal shock resistance, oxidation and corrosion resistance, hardness, wear resistance and general high-temperature properties. Depending on what is required, the following potential advantages can be obtained:

1. Manufacturing of parts to near net shape, such parts then consisting either completely or only superficially of i-3A.
2. i-3A sealing of the surfaces of parts, i.e. improvement of their tribological, thermomechanical and chemical properties.
3. Possibility of sealing the surfaces not only of ceramic components but also of metallic (e.g. "rusty" steel) parts and, with skilful process control, also of parts made of appropriately modified cement or concrete.
4. Shrinkage-free in-situ manufacture of an i-3A matrix for fiber-reinforced composites.
5. Easy, non-dangerous and ecologically sound preparation (in aqueous media) of the preform suitable for the reaction.
6. Applicability of all dry and wet powder-metallurgical methods for production of the preform—in the form of parts, layers, joints and matrices.
7. Formation of layers of precursor using coating techniques such as thermal or plasma spraying, CVD or PVD.
8. Low-complexity process control through dipping of the preformed parts (or the preform-modified surfaces of components) into molten aluminium at temperatures ranging from 750 to 1100° C., i.e. at temperatures at which most prepregs are stable.
9. Use of pressure-die facilities (squeeze casters) and other casting apparatus and machinery used for the manufacture of Al components.
10. Good wetting of the preform by molten aluminium or aluminium alloys as a result of the aluminide reaction.
11. Production of a nonporous i-3A microstructure—at least in the property-defining surface area—due to the remaining pore space being filled with Al.

On account of these properties, especially their wear-resistance and high-temperature stability, the parts fabricated according to the invention are suitable as components for the construction of machinery, apparatus, engines and turbines, as also for use in corrosion and oxidation tests. They can also be used as functional elements, in particular as high-performance brake elements and as electrical or magnetic functional elements.

The following examples explain the invention and the embodiments described above in more detail.

EXAMPLE 1

In order to apply the relations contained in equations (2) and (3), the following example was carried out experimentally: 100 g of a powder mixture consisting of 32 vol. % TiO$_2$ and 68 vol. % Al$_2$O$_3$ was attrited for 1 h in water, then Rotovap-dried and subsequently pressed isostatically using 300 MPa to cylindrical samples measuring 10 mm in height and 10 mm in diameter. These green samples had a density of approx. 60% TD. This had not changed significantly after 30 min presintering in air at 1200° C. (Pg=41%). This means P=0.68 and ΔV=0.62. Accordingly, after complete reactive infilitration, there should be a remaining aluminium proportion of 6% (P$_{rest}$=P−ΔV). Pure Al was infiltrated in an Al$_2$O$_3$ crucible furnace at 850° C. for 20 min under an Ar pressure of 12 MPa. The completey reacted 1-3A sample had almost the same dimensions (linear deviation of 0.2%) and consisted of approx. 55 vol. % Al$_2$O$_3$, approx. 35 vol. % TiAl$_3$ and about 10 vol. % Al. This result corresponds relatively well with what is anticipated theoretically. In a further experiment in which the same precursor slurry was used, a prepreg comprising 10 layers of an Al$_2$O$_3$ fabric (Nextel 720) was infiltrated with precursor and then pressed and presintered under the same conditions as before. The precursor-infiltrated prepreg, which had shown small cracks after presintering, was free of cracks following reactive infiltration and totally non-porous. Analysis of a section through the sample, as represented in the FIG., showed that the Al$_2$O$_3$ fibers were surrounded mainly by TiAl$_3$, and that the additional Al$_2$O$_3$ formed by the reaction had not "grown" on the fibers.

EXAMPLE 2

Figures 1, 3D:
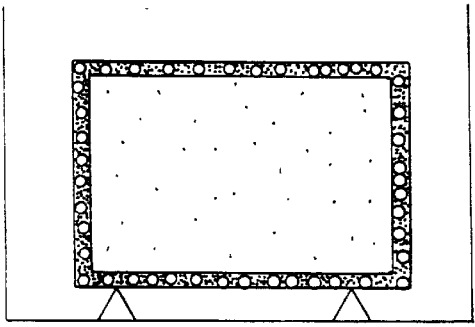
Figures 2, 3D:
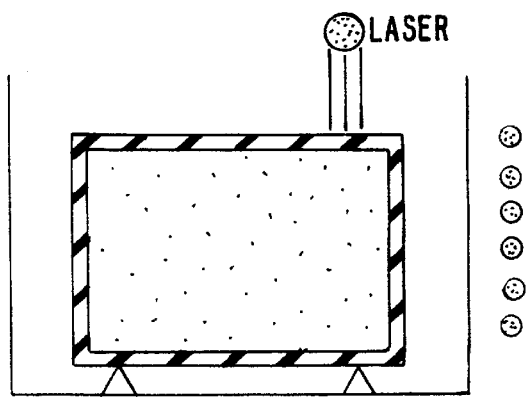
Figures 1, 4A:
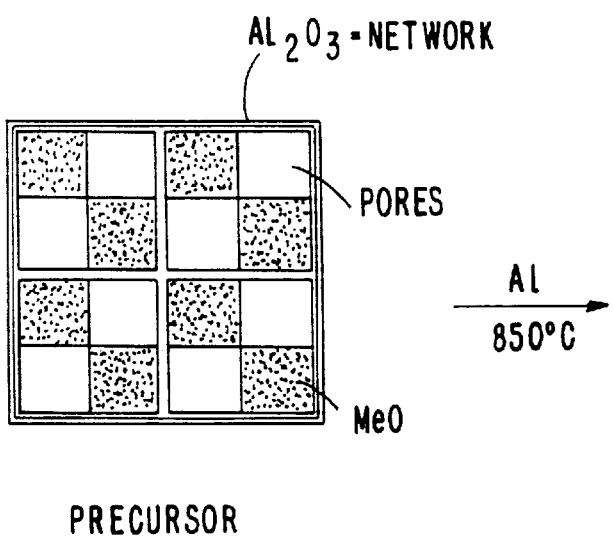
Figures 2, 4A:
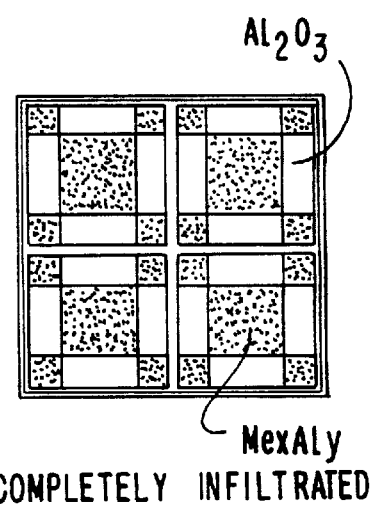

In a further experiment, the slurry of Example 1 was used to make a cylindrical Al$_2$O$_3$ sample, which was pressed as in Example 1 and presintered at 1100° C. for 20 min (open porosity approx. 45%) and then dipped several times into the slurry so as to obtain a covering layer approx. 100 μm thick. The porous part coated in this way was subsequently sintered for 20 min at 1300° C. and then subjected to reactive infiltration as in Example 1. Subsequent to this treatment the cylinder consisted of a porous Al$_2$O$_3$ interior having the dimensions of the presintered sample with an approx. 100 μm-thick coating that had the same composition as the previously described solid i-3A cylinder. This example is represented schematically in FIG. 3d. Dense basic parts made of various types of materials can also be sealed and coated with i-3A composites in this way.

EXAMPLE 3

Cylindrical samples consisting of 68 vol. % Al$_2$O$_3$ and 32 vol. % TiO$_2$ were pressed as in Example 1 under pressures up to 300 MPa and then sintered for 1 h in air. The density thereafter was approx. 65% TD. These samples were then placed in an Al$_2$O$_3$ crucible and fixed in position with an Al$_2$O$_3$ tube to prevent them from floating. Al powder (Alcan 105) containing, in addition, 5 wt. % Mg powder was then poured over them. The crucible was subsequently heated under vacuum to 1000° C. and kept at this temperature for 20 min, allowing the Al alloy to penetrate and react with the TiO$_2$. The precursor reacted completely in this case. In a similar experiment with pure Al a core region of the cylindrical sample remained unreacted (schematically represented in FIG. 2 I and II center), which indicates that wetting was not quite as good as with the alloy containing Mg and, as a result, the surface region became "blocked" early on with the reaction product TiAl$_3$+Al$_2$O$_3$.

EXAMPLE 4

100 g of a powder mixture made up of 50 vol. % Al$_2$O$_3$ (MPa 4, Ceralox Condea, Brunsbüttel) and 50 vol. % TiO$_2$ (Riedel de-Haen, Seelze) were ground for 4 h in water in an attrition mill containing 3Y-TZP milling balls (3 Y$_3$O$_3$—ZrO$_2$, 2 mm diameter). After drying in a Rotovap dryer, cylindrical precursor samples (5 mm high, 10 mm in diameter) were pressed isostatically under pressures ranging from 50 to 900 MPa. The green density varied between 49% TD (50 MPa) and 62% TD (900 MPa). Some of the samples were presintered in air at 1100° C. for 1 h, their dimensions remaining unchanged. The samples were subsequently dipped into molten Al (pure Al, 99,999%)—see FIG. 1a—and subjected at 900° C. to an Ar gas pressure of 10 MPa for 30 min. The samples were then removed from the Al bath, cooled in air and split axially. Analysis showed that the external dimensions had increased by less than 0.5%. Samples where the precursor green density had been up to approx. 55% TD had reacted right through, i.e. no more TiO$_2$ could be detected. These samples consisted of 70 vol. % α-(Al$_2$O$_3$ and 30 vol. % of a mixture of TiAl$_3$ and TiAl with approx. 1.5–5 vol. % Al. Samples where the precursor green density had been >55% TD still contained traces of TiO$_2$, with the 62% TD sample being completely unreacted in the center. 10-kg Vickers-hardness impressions in polished i-3A samples showed ramified cracks from which K$_{IC}$ values of over 6 MPa √m could be estimated.

EXAMPLE 5

A similar series of experiments as in Example 4 was carried out in which, instead of TiO$_2$, use was made of (a) NiO (Aldrich, Steinheim), (b) Fe$_2$O$_3$ (Aldrich, Steinheim), (c) Nb$_2$O$_5$ (Johnson Matthey, Karsruhe), (d) m-ZrO$_2$ (Dynazirkon F, Dynamit Nobel AG), (e) MoO$_3$, (Cu—byproduct, Uni Chile, Santiago), (f) ilmenite (TiFeO$_3$, CSIR, New Zealand) and (g) a mixture (50: 50) of ZrO$_2$ and Nb$_2$O$_5$. As in Example 4, the Al reaction was carried out and the sample analyzed. In all cases almost exactly the same microstructure was obtained as in Example 4, i.e. besides the Al$_2$O$_3$ matrix a continuous aluminide phase was formed, the phase richer in aluminium being dominant in each case. Small quantities of Al (<5 vol. %) could still be detected in all cases. The typical miscrostructural dimensions (Al$_2$O$_3$ grain size, aluminide ligament diameter) ranged between 0.5 and 5 μm.

EXAMPLE 6

A series of precursor samples made up of ZrO$_2$ without Al$_2$O$_3$ and one made up of 80 vol. % Al$_2$O$_3$ and 20 vol. % ZrO$_2$ was prepared and heat-treated as in Example 4. Whereas the sample containing 80 vol. % Al$_2$O$_3$ was transformed completely into an i-3A microstructure, without there being a significant change in dimensions, the pure ZrO$_2$ sample expanded and disintegrated in molten Al (FIG. 2-III c).

EXAMPLE 7

100 g of a powder mixture comprising 70 vol. % Al$_2$O$_3$ and 30 vol. % TiO$_2$ were attrited in water as in Example 4; the slurry was then cast in plaster molds to sheets measuring 65×50×10 mm, dried and then heated in air at a rate of 2° C./min to 1200° C., being kept at this temperature for 30 min. The density was then 69.5% TD. After being pressure-infiltrated with pure Al at 850° C. for 20 min under 12 MPa Ar pressure, the samples had reacted right through, i.e. they consisted mainly of Al$_2$O$_3$ (grain size 0.3–2 μm), with a continuous metallic phase of TiAl$_3$ and small quantities (<5 vol. %) of XRD-detectable Al.

EXAMPLE 8

The samples presintered as in Example 7 were infiltrated in an Al$_2$O$_3$ crucible with an Al alloy containing 2.5% Mg.

Infiltration was carried out in an $N_2$ atmosphere and without the application of pressure (i.e. 0.1 MPa $N_2$) at 1100° C. After 30 min the samples were fully reacted, the microstructure not being any different to that of the samples of Example 7.

EXAMPLE 9

Green compacts (cylindrical, 4 mm high, 20 mm diameter) pressed uni-axially under 50 MPa and made up of $Nb_2O_5$ powder (as in FIG. 2c) without $Al_2O_3$, having a density of 52% TD, were placed without prior sintering in an $Al_2O_3$ crucible which likewise had an internal diameter of 20 mm. The samples were then reaction-infiltrated with the Al alloy of Example 4, containing 2.5% Mg, at 900° C. for 30 min, the alloy having been placed previously in solid pieces over the green precursor. After it had cooled the crucible was halved axially and the product analyzed. The original compact (i.e. the green precursor) had been converted completely into $Al_2O_3$ and $NbAl_3$, with traces of Al, without there being any measurable change in volume. In a similar experiement, instead of the compact, $Nb_2O_5$ powder was poured into the crucible and pressed lightly under 2 MPa (density 38% TD), then infiltrated as before and analyzed. The reaction product had expanded slightly in the axial direction (prevented radially by the crucible). It consisted of approx. 55 vol. % $NbAl_3$ and Al and 45 vol. % $Al_2O_3$, with typical phase dimensions of 1–15 $\mu$m.

We claim:

1. A process for fabricating a cerametallic composite part containing a phase made of 20 to 80 vol. % $Al_2O_3$ which is permeated by a metallic phase consisting substantially of aluminides comprising:
   providing a preform comprising at least one oxidic compound reducible by aluminum and optionally non-oxidic compounds or elements; and
   reacting the preform with a member selected from the group consisting of molten aluminum and aluminum alloy in an inert atmosphere to form aluminide and $Al_2O_3$ in at least one surface layer.

2. The process of claim 1 wherein said preform is selected from the group consisting of an unsintered green compact and a precursor obtained by sintering a green compact.

3. The process of claim 1 wherein the preform is an oxide-containing preform.

4. The process of claim 1 wherein the preform comprises 20 to 50 vol. % $Al_2O_3$.

5. The process of claim 1 wherein the preform contains $Al_2O_3$ in a quantity such that the $Al_2O_3$ phase forms a continuous supporting framework.

6. The process of claim 1 wherein the preform has a grain size and the reaction conditions with the molten aluminium are selected such that an average $Al_2O_3$ grain size in the range of from 0.1 to 10 $\mu$m is obtained.

7. The process of claim 1 wherein the preform contains as oxidic compound reducible by aluminum at least one compound selected from the group consisting of CaO, $Cr_2O_3$, CuO, CoO, $Co_2O_3$, FeO, $Fe_2O_3$, $Fe_3O_4$, $HfO_2$, $Li_2O$, MnO, MgO, $MoO_3$, $Na_2O$, $Nb_2O$, $Nb_2O_5$, NiO, $SiO_2$, TiO, $TiO_2$, $V_2O_5$, $WO_3$, $Y_2O_3$, $ZrO_2$, mullites, spinels, zirconates, titanates, ores containing Fe, Ti, Co, Ni, Zr, Si, Nb, zircon and ilmenite.

8. The process of claim 1 wherein the preform is formed from powdered particles having a size of from 0.1 to 100 $\mu$m components by pressing, spraying, or slip casting.

9. The process of claim 1 wherein the preform is made from a powder having an average particle size in the range from 0.1 to 100 $\mu$m.

10. The process of claim 9 wherein at least one of a ceramic phase or a metallic phase is added to said powder.

11. The process of claim 9 wherein at least one of a reinforcing element and a functional element are added to said powder.

12. The process of claim 11 wherein said powder comprises at least one of particles, nodules, flakes, whiskers, or fibers.

13. The process of claim 11 wherein said powder comprises from 5 to 50% by volume reinforcing additives.

14. The process of claim 11 wherein at least one of said reinforcing elements and functional elements have a diameter in the range of from 0.5 to 1000 $\mu$m.

15. The process of claim 11 wherein said at least one reinforcing element and functional element comprises a member selected from the group consisting of oxides, carbides, nitrides, borides, and silicides.

16. The process of claim 11 wherein said at least one reinforcing and functional elements comprises a member selected from the group consisting of carbon, diamond, SiC, $Al_2O_3$, $Si_3N_4$, TiC, WC, and/or $ZrO_2$.

17. The process of claim 11 wherein the reinforcing or functional elements consist of platelets or continuous or discontinuous fibers having a diameter in the range of from 5 to 150 $\mu$m.

18. The process of claim 17 wherein the reinforcing or functional elements is a preform consisting of continuous fibers.

19. The process of claim 11 wherein the reinforcing element comprises a member selected from the group consisting of coated or non-coated SiC, SiCB, SiCBN, $Si_3N_4$, and mullite fibers.

20. The process of claim 1 wherein the preform is made using a powder metallurgical technique.

21. The process of claim 1 wherein the preform has an open porosity of from 5 to 60%.

22. The process of claim 21 wherein the open porosity is 10 to 40%.

23. The process of claim 1 wherein the preform comprises a base body comprising at least one layer.

24. The process of claim 23 wherein a precursor powder is applied to said base body, wherein said at least one layer of said body comprises an inorganic material and said layer has a thickness of from 10 $\mu$m to 1 cm.

25. The process of claim 2 wherein the green compact is sintered in an oxygen-containing atmosphere at a temperature in the range of from 1000 to 1400° C.

26. The process of claim 1 wherein the preform is sintered to a density of greater than 95% of theoretical density.

27. The process of claim 26 wherein said preform is obtained by sintering at temperatures between 1400 to 1700° C.

28. The process of claim 1 wherein the reacting step is carried out at a temperature in the range of from 660 to 1300° C.

29. The process of claim 28 wherein the reacting step is carried out at a temperature of from 750 to 1100° C.

30. The process of claim 1 wherein the preform is maintained in contact with the molten aluminium or molten aluminium alloy until at least the surface region has been converted partly into $Al_2O_3$, and aluminides.

31. The process of claim 1 wherein the preform is immersed into molten aluminium or aluminium alloy.

32. The process of claim 1 wherein the molten aluminum or aluminum alloy is applied to the surfaces of the preform.

33. The process of claim 1 wherein the aluminum or the aluminum alloy is applied to the surface of the preform as a powder suspension and is liquified by a heat treatment acting on the surface.

34. The process of claim 1 wherein the resultant cerametallic composite part is subjected to an after treatment by heating in an oxygen-containing atmosphere between 800 and 1400° C. until an $Al_2O_3$-enriched covering layer is formed.

35. The process of claim 1 wherein the composite part is annealed in a vacuum, an inert or a reducing atmosphere at a temperature in the range of from 1300 to 1600° C.

36. The process of claim 1, wherein said preform is sintered.

37. The process of claim 1, wherein said preform further comprises at least one member selected from the group consisting of a non-oxide compound, a non-oxide element and mixtures thereof.

* * * * *

UNITED STATES PATENT AND TRADEMARK OFFICE
CERTIFICATE OF CORRECTION

PATENT NO. : 6,051,277
DATED : April 18, 2000
INVENTOR(S) : Claussen et al.

It is certified that error appears in the above-identified patent and that said Letters Patent is hereby corrected as shown below:

On the Title Page, in the section entitled <u>Abstract, line 1,</u> delete "The invention relates to " and insert - - Disclosed is - -.
In <u>column 2, line 2,</u> after "1991" insert - - ) - -.
In <u>column 2, line 23,</u> change "M," to - - $M_1$ - -.
In <u>column 4, line 39,</u> change "Ta3Al" to - - $Ta_3Al$ - -.
In <u>column 10, line 17,</u> before "$AL_2O_3$" delete - - ) - -.

Signed and Sealed this

Twenty-seventh Day of March, 2001

*Attest:*

NICHOLAS P. GODICI

*Attesting Officer*   *Acting Director of the United States Patent and Trademark Office*